(12) United States Patent
Strain

(10) Patent No.: US 7,467,517 B2
(45) Date of Patent: Dec. 23, 2008

(54) TRANSDUCER OR MOTOR WITH FLUIDIC NEAR CONSTANT VOLUME LINKAGE

(76) Inventor: David Strain, 35 O'Brien Avenue, Stouffville, ON (CA) L4A 1G6

( * ) Notice: Subject to any disclaimer, the term of this patent is extended or adjusted under 35 U.S.C. 154(b) by 563 days.

(21) Appl. No.: 10/829,977

(22) Filed: Apr. 23, 2004

(65) Prior Publication Data
US 2005/0238519 A1    Oct. 27, 2005

(51) Int. Cl.
*H01H 36/00*    (2006.01)
*F15B 21/00*    (2006.01)

(52) U.S. Cl. ............................ 60/538; 60/545
(58) Field of Classification Search ............ 60/538, 60/545
See application file for complete search history.

(56) References Cited

U.S. PATENT DOCUMENTS

| | | | |
|---|---|---|---|
| 147,519 A | 2/1874 | Reilley | |
| 345,446 A | 7/1886 | Powers | |
| 696,768 A | 4/1902 | Sleeper | |
| 2,618,930 A | 11/1952 | Quinn | |
| 3,175,500 A * | 3/1965 | Zeigler | 60/469 |
| 3,569,647 A * | 3/1971 | Kiwalle | 200/81.8 |
| 3,629,674 A * | 12/1971 | Brown | 417/417 |
| 3,643,435 A * | 2/1972 | Klee | 60/547.1 |
| 3,987,767 A | 10/1976 | Buske | |
| 4,027,480 A | 6/1977 | Rhodes | |
| 4,044,654 A | 8/1977 | Guillon | |
| 4,256,018 A | 3/1981 | Badoureaux et al. | |
| 4,451,209 A * | 5/1984 | Phillips | 417/38 |
| 4,651,690 A | 3/1987 | Yang | |
| 5,081,840 A | 1/1992 | Landon | |
| 5,145,338 A | 9/1992 | Murray | |
| 5,640,992 A * | 6/1997 | Huang | 137/487.5 |
| 5,865,028 A | 2/1999 | Klauk et al. | |
| 6,782,800 B2 | 8/2004 | Strain | |

FOREIGN PATENT DOCUMENTS

DE    1 523 671    1/1970
WO    WO 03065397 A1 *    8/2003

* cited by examiner

*Primary Examiner*—Thomas E Lazo

(57) ABSTRACT

The invention uses a solenoid to apply a force to a fluid in communication with a near constant volume fluidic linkage. A voltage applied to the solenoid pressurizes the fluid causing the constant volume fluidic linkage to displace. In this way, a transducer is created that converts voltage into a displacement. To create a motor, the displacement is used to stop the application of the voltage to the solenoid allowing the constant volume fluidic linkage to return to an initial state. The return to the initial state then triggers the re-application of the voltage. In this way, the voltage source is used to create a reciprocating motion.

12 Claims, 1 Drawing Sheet

TRANSDUCER OR MOTOR WITH FLUIDIC NEAR CONSTANT VOLUME LINKAGE

FIELD OF THE INVENTION

This invention relates to transducers or motors having fluidic linkages and to the use of Bourdon tubes or similar devices that produce a displacement in response to an applied pressure but with minimal, if any, change in volume.

BACKGROUND OF THE INVENTION

A Bourdon tube is a fluidic linkage used in gauges to measure pressure. The Bourdon tube is essentially a tube bent along its length into an arc of generally constant radius. In cross-section, the tube may be a roughly oval shape or have a flat inner wall and a curved outer wall. One end of the tube has a fitting that allows the inside of the tube to be connected to a source of pressurized fluid. The other end of the tube is closed. The end with the fitting also has a fixture or mount for use in attaching the tube to the gauge body. The closed end has a hook or loop for attachment to the needle of the gauge. When the pressure inside the tube is increased, the curve flattens out causing the distance between the ends to increase and the needle to move. However, the volume inside of the tube changes only very slightly, if at all. This characteristic is useful for precision gauges because it reduces or eliminates unintended reductions in pressure or increases in volume of a system being measured.

SUMMARY OF THE INVENTION

It is an object of the invention to use a constant volume fluidic linkage as a transducer or part of a motor. The term constant volume fluidic linkage will be used in this patent to refer to devices, such as Bourdon tubes, that produce a displacement in response to pressure but with very little, if any, change in volume. While Bourdon tubes are an example of this sort of linkage, other fluidic linkages, such as coiled tubes may exhibit similar characteristics. For example, a coil of tubing, closed at one end and connected to a source of pressure at the other, may lengthen or unroll when the applied pressure is increased although the volume inside the coil changes by only a small degree, if at all. Any change in volume of these sorts of linkages within their intended range of operation results from unintended elastic deformation of the walls of the linkage or changes in the geometry of the contained space achieved without changes (but for that caused by the deformation of the walls) to the peripheral area of the contained volume. The invention uses these characteristics to convert an input of energy manifested as a varying fluid pressure, produced with minimal or no change in volume of the fluid, into an output of energy in the form of a force applied through a distance.

In one aspect or embodiment, the invention uses a solenoid to apply a force to a fluid in communication with a near constant volume fluidic linkage. A voltage applied to the solenoid pressurizes the fluid causing the constant volume fluidic linkage to displace. In this way, a transducer is created that converts voltage into a displacement. To create a motor, the displacement is used to stop the application of the voltage to the solenoid allowing the constant volume fluidic linkage to return to an initial state. The return to the initial state then triggers the re-application of the voltage. In this way, the voltage source is used to create a reciprocating motion. Because the displacement is produced through a constant volume fluidic linkage, the solenoid travels only through a minimal, if any, stroke. Because very little, if any, change in volume is required, the fluidic piston may be replaced with another linkage, such as one with a diaphragm wall that does not require moving seals. Alternately, the size of any moving seals may be minimized. Among other advantages, the transducer or linkage may avoid one or more of the inefficiency, mechanical complexity and wear related problems associated with long-stroke solenoids or conventional stroking fluid pistons. Although a voltage source is used as the input energy source, analogous transducers or motors may use fluid pressure sources, such as compressed air or a liquid pressure, as the input energy either to replace the solenoid as the drive for the plunger or to pressurize the inside of the constant volume fluid linkage directly. Liquids, particularly minimally compressive liquids, are preferred for use in all fluid filled parts of the transducer or motor to reduce volume changes due to compression of the fluid. A volume compensating circuit or device may be used to reduce or eliminate the effects of any change in the volume contained in the transducer or motor or the effects of compression of the contained fluid.

This summary is intended to introduce the reader to the invention but not to define or limit the invention. Other aspects of the invention may reside in other combinations or sub-combinations of elements or steps described above or in other parts of this patent.

BRIEF DESCRIPTION OF THE DRAWINGS

One or more embodiments of the invention will now be described with reference to the following figure(s).

DETAILED DESCRIPTION OF THE INVENTION

Figure 1:
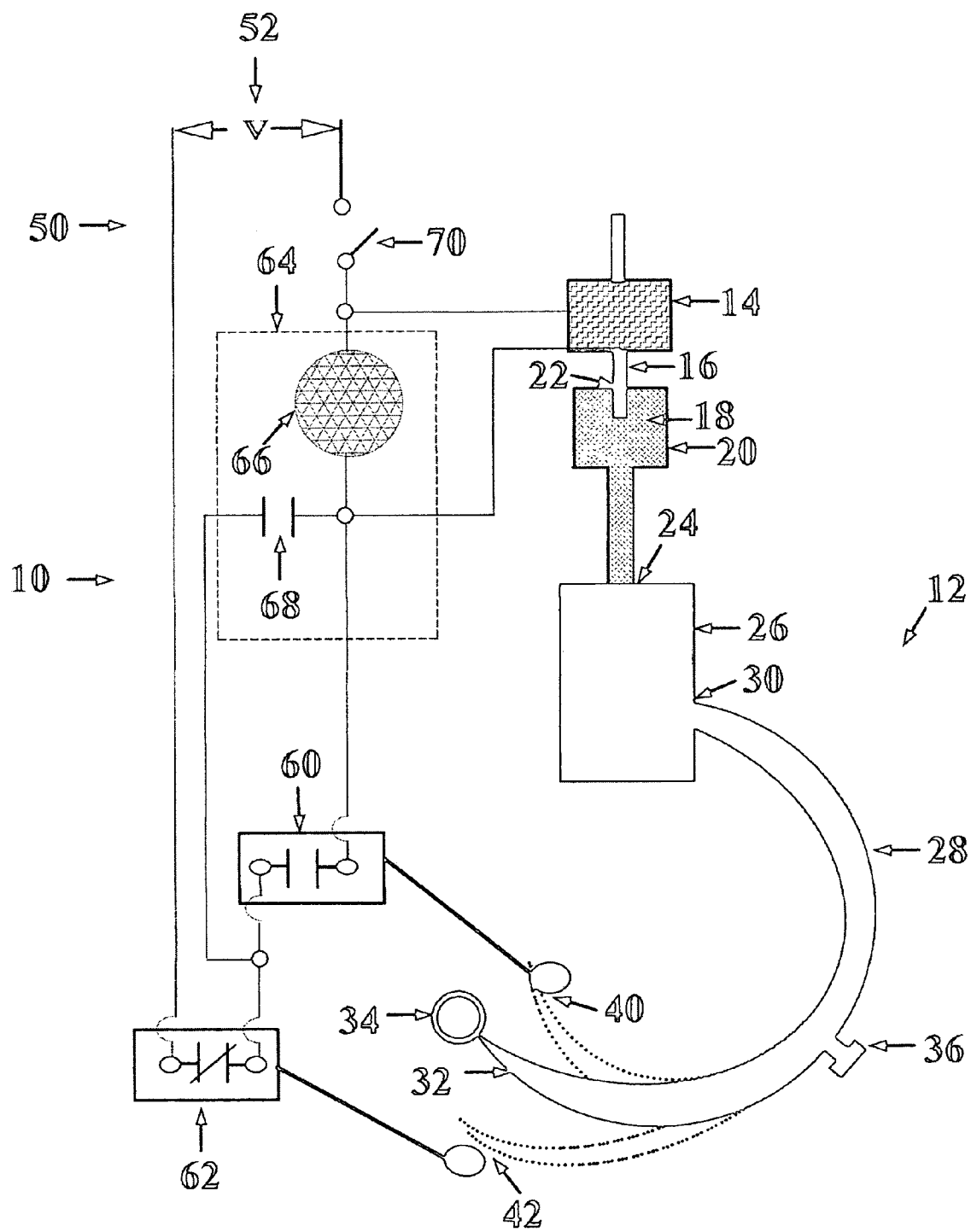
FIG. 1 is a schematic representation of a motor having a transducer with a constant volume fluidic linkage.

FIG. 1 shows a motor 10 having a transducer 12 which converts electrical energy or pressure into a reciprocating energy. The transducer 12 has a solenoid 14 that applies a force to a plunger 16 when a voltage is applied to the solenoid 14. The plunger 16 may or may not move in response to the applied force. The plunger 16 bears on a fluid 18 in a container 20. For example, the plunger 16 may protrude into the container 20 through a seal 22 which may be an O-ring, U-cup or other type of seal. The seal 22 permits movement of the plunger 16 while maintaining a seal between the plunger 16 and container 20. Thus, if the contained volume in the motor 10 increases by a small amount or if the fluid compresses by a small amount when the fluid is pressurized, movement of the plunger 16 into the container 20 can compensate for these effects by decreasing the contained volume of the motor 10. Alternately, the plunger 16 may bear on the outside of a diaphragm wall of the container 20 or the plunger 16 and container 20 may be a conventional fluidic piston.

The container 20 is connected through fitting 24 to the base 26 of a Bourdon tube 28. As discussed above, other sorts of (near) constant volume fluid linkages may be used in place of the Bourdon tube 28. The base 26 allows the Bourdon tube 28 to be mounted to a structure and also provides a path for fluid communication between the fitting 24 and first end 30 of the Bourdon tube 28. A second end 32 of the Bourdon tube 28 has a hook 34 for attaching the motor 10 to a driven device, for example a crankshaft. A vent valve 36 allows air to be bled from the Bourdon tube 28 so that it is filled entirely with the fluid 18. The fluid 18 is preferably a minimally compressive liquid such as water, mercury or glycerine.

When the fluid 18 is at an initial pressure, the second end 32 of the Bourdon tube 28 rests in a first position 40. When a voltage, resulting in a current, is applied to the solenoid 14, a force is applied to the plunger 16 which pressurizes the fluid 18. This causes the second end 32 of the Bourdon tube 28 to move to a second position 42. When the voltage is removed, the second end 32 of the Bourdon tube 28 returns to the first position 40. An electrical circuit 50 connects a voltage source 52 to the solenoid 14 when the second end 32 of the Bourdon tube 28 is in the first position 40 and disconnects the voltage source 52 when the second end 32 of the Bourdon tube 28 reaches the second position 42. In this way, the second end 32 of the Bourdon tube 28 is made to reciprocate continuously between the first position 40 and second position 42.

In greater detail, the electrical circuit 50 has a first switch 60, a second switch 62, an on-off switch 70 and a relay 64 having a relay coil 66 and a relay contact 68 connected as shown. The relay coil 66 of the relay 64 is wired in parallel with the solenoid 14 and, when energized, the relay coil 66 closes the relay contact 68. Accordingly, the relay contact 68 allows current to flow through it whenever the solenoid 14 is activated. First switch 60 is normally open but is held closed by the Bourdon tube 28 while the Bourdon tube 28 is in the first position 40. The second switch 62 is normally closed but is held open by the Bourdon tube 28 while the Bourdon tube 28 is in the second position 42. When the motor is at rest, with on-off switch 70 open, the Bourdon tube 28 is in the first position 40 and first switch 60 is closed. To start the motor, on-off switch 70 is toggled to a closed position. Current then flows through the solenoid 14 and the relay coil 66, through the first switch 60 and second switch 62. Relay coil 66 becomes energized and closes relay contact 68. Thus, as the solenoid 14 causes the Bourdon tube 28 to move, first switch 60 becomes open but current continues to travel through solenoid 14, relay coil 66, relay contact 68 and second switch 62. However, when the Bourdon tube 28 reaches the second position 42, second switch 62 is opened breaking the circuit through the solenoid 14 and relay coil 66. Relay contact 68 opens so that, as the Bourdon tube 28 retracts and second switch 62 closes again, the circuit through solenoid 14 remains broken. Bourdon tube 28 retracts all the way to the first position 40 at which point the cycle is repeated as described for when the motor 10 was first turned on. The motor 10 continues to cycle in this way until on-off switch 70 is opened to disconnect the voltage source 52. Other electrical circuits which alternately make and break the circuit between the voltage source 52 and solenoid 14 can be used. Alterations to other parts of the motor 10 may also be made within the scope of the invention.

I claim:

1. A transducer comprising:
   a) a near or constant volume fluidic linkage;
   b) a fluid filling the inside of the near or constant volume fluidic linkage;
   c) a plunger in direct communication with the fluid such that a force applied to the plunger pressurizes the fluid and releasing the force applied to the plunger reduces the pressure of the fluid; and,
   d) a solenoid to apply a force to the plunger to pressurize the fluid when the solenoid is energized,
   wherein the fluid is sealed inside the transducer.

2. The transducer of claim 1 wherein the linkage comprises a Bourdon tube.

3. A motor comprising:
   a) a transducer having a near or constant volume fluidic linkage movable between a first position and a second position;
   b) a fluid sealed inside of the transducer;
   c) an energy or pressure source operable to temporarily increase the pressure in the fluid to a higher pressure from a lower pressure and to return the pressure in the fluid to the lower pressure while the fluid remains sealed inside the transducer; and,
   d) a device to operate the energy or pressure source considering the position of the linkage,
   wherein the linkage moves to the first position when the energy or pressure source is operated to increase the pressure of the fluid and moves to the second position when the energy or pressure source is not operated to increase the pressure of the fluid,
   and wherein the device operates the energy or pressure source to increase pressure in the fluid starting when the linkage reaches the second position and ending when the linkage reaches the first position,
   whereby the transducer reciprocates repeatedly while the fluid remains sealed inside the transducer.

4. The motor of claim 3 wherein the linkage is a Bourdon tube.

5. The motor of claim 3 wherein the linkage is a hollow spring.

6. The motor of claim 3 wherein the linkage is attached to a device driven by the motor.

7. The motor of claim 3 wherein the linkage is attached to a crankshaft.

8. A motor comprising:
   a) a near or constant volume fluidic linkage movable between a first position and a second position;
   b) a fluid filling the inside of the linkage;
   c) an energy or pressure source operable to temporarily increase the pressure in the fluid to a higher pressure from a lower pressure ; and,
   d) a device to operate the energy or pressure source considering the position of the linkage,
   wherein the linkage moves to the first position when the fluid is at the higher pressure and moves to the second position when the fluid is at the lower pressure,
   and wherein the device operates the energy or pressure source to provide the higher pressure when the linkage reaches the second position and to provide the lower pressure when the linkage reaches the first position,
   and wherein the device comprises first and second switches connected to the energy or pressure source and configured so that one of the switches is toggled when the linkage reaches the first position and the other switch is toggled when the linkage reaches the second position.

9. The motor of claim 8 wherein the linkage comprises a Bourdon tube.

10. The motor of claim 8 wherein the linkage comprises a hollow spring.

11. The motor of claim 8 wherein the linkage is attached to a device driven by the motor.

12. The motor of claim 8 wherein the linkage is attached to a crankshaft.

* * * * *